(No Model.)
S. BANCROFT.
ELIMINATOR OR WATER SEPARATOR.
No. 589,492. Patented Sept. 7, 1897.
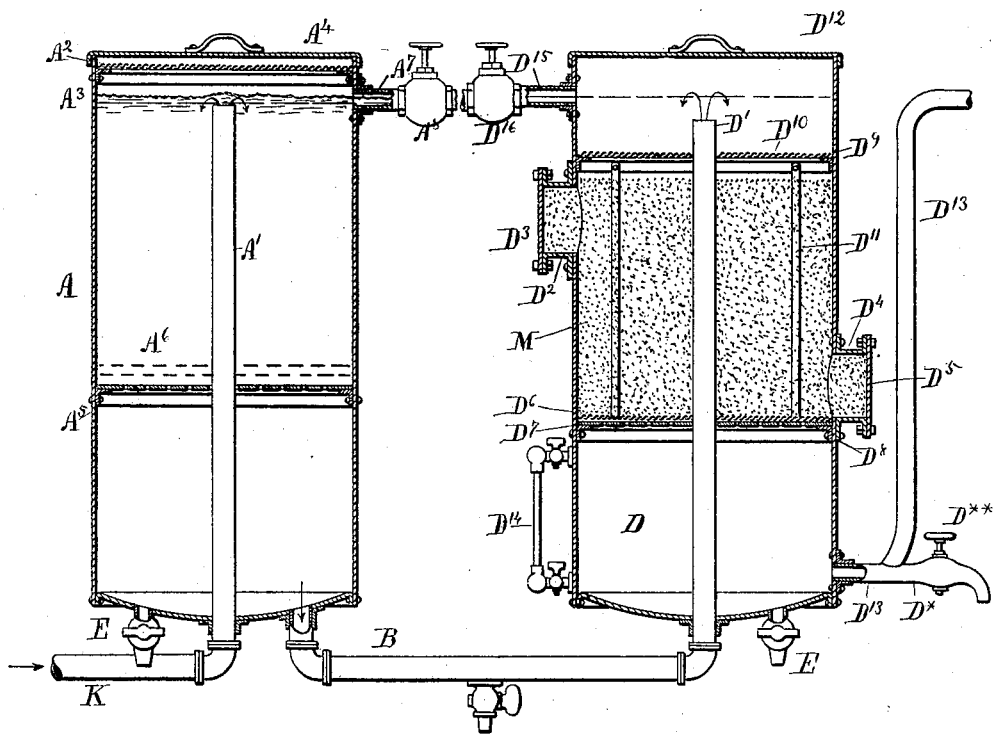
WITNESSES:
Henry T. Kirsch.
M. T. Boyle.
INVENTOR:
Sidney Bancroft
BY
Thomas Drew Stetson
ATTORNEY.

United States Patent Office.

SIDNEY BANCROFT, OF BROOKLYN, NEW YORK, ASSIGNOR TO HIMSELF, AND JOHN H. DALLEY, OF NEW YORK, N. Y.

ELIMINATOR OR WATER-SEPARATOR.

SPECIFICATION forming part of Letters Patent No. 589,492, dated September 7, 1897.

Application filed December 14, 1896. Serial No. 615,609. (No model.)

*To all whom it may concern:*

Be it known that I, SIDNEY BANCROFT, a citizen of the United States, residing in Brooklyn, Kings county, in the State of New York, have invented a certain new and useful Improvement in Eliminators or Water-Separators, of which the following is a specification.

The discharge from the exhaust-ports of a steam-engine is composed mainly of steam, but there is a certain proportion of liquid material thus discharged technically known as "drip." The invention applies to this latter and also to any portion of the discharge which becomes liquid at a later stage. Its purpose is to obtain from the impure liquid the main constituent—water—in sufficient purity to be pumped back into the boiler or to be used for culinary or other purposes. It also allows the oil to be recovered and utilized. I will for brevity refer to the liquid generally as "drip."

The accompanying drawing forms a part of this specification and is a central vertical section through the apparatus in connection with one or more stationary high-pressure steam-engines. (Not shown.)

In the drawing, A is an upright cylindrical tank of sheet metal or other suitable material, and A' a pipe extending upward in the interior thereof, receiving the drip at its lower end through a pipe K and allowing it to overflow gently at its upper end near the top of the tank.

$A^2$ is a perforated plate resting on convenient internal supports $A^3$. A loosely-fitting cover $A^4$ is applied to exclude dust and the like.

Near the mid-height of the interior of the tank A is an internal ledge $A^5$, supporting a retarder composed of three horizontal perforated plates $A^6$, held a little distance apart and connected by thimbles and bolts, as shown. The perforations in these plates are out of line with each other, so that the water in traversing downward in the tank finds a great number of passages, but all joggled, so that any strong impulse of the water at any point due to any cause shall be arrested, and the motion is made gentle and practically uniform over the whole cross-area of the tank.

B is a pipe leading from the bottom of the tank A and connecting to a corresponding pipe D' in a second upright tank D, but with its top a quarter of an inch (more or less) below the level of the top of the corresponding pipe A'. The mid-height of this second tank D is packed with sawdust or some analogous form of wood M, which may be introduced in a wet condition through a nozzle $D^2$, closed by a removable cover $D^3$, and may be removed, when required, through a nozzle $D^4$, controlled by a removable plate $D^5$. The filtering material is held up by two horizontal perforated plates $D^6$ $D^7$, the uppermost of which may be wire-gauze and the lowermost a stout perforated plate of iron resting on a slight internal ledge $D^8$. Above the filtering material are two corresponding horizontal perforated plates $D^9$ $D^{10}$, which are supported by uprights $D^{11}$, attached to one of the lower plates. The arrangement makes it easy to draw out the filtering material through the lower aperture $D^4$ and then to lift out the perforated plates and their supports. $D^{12}$ is a loose cover fitted on this second tank.

$D^{13}$ is a branched pipe leading from a point near the bottom of the tank D. The main part extends upward to the level of the top of the pipe D' and thence away to any suitable tank. (Not shown.) This insures that water shall be allowed free escape from the vessel D without even rising much above the top of the pipe D', and consequently without interfering with the gentle action constantly going on in the tank A. A branch from a low point in the pipe $D^{13}$ (marked $D\text{*}$) is equipped with a stop-cock $D\text{**}$, by opening which pure hot water can be obtained from the tank D at any time. The level of the water in the tank D may by this means be temporarily drawn down to any extent desired.

$D^{14}$ is a glass gage, which may be of any ordinary or suitable style, adapted to show the water-level when the second tank is only partly filled with water. This gage should be observed, so as to always arrest the discharge through the pipe $D\text{*}$ in time to prevent the appearance at this point of the thin stratum of oily water which is liable to lie on the top of the water in this tank.

$A^7$ is an overflow-passage near the level of the pipe A', controlled by the cock A⁸, by opening which cock the upper portion of the liquid in the vessel A may be discharged.

D¹⁵ is a corresponding overflow-passage from the second tank D, controlled by the cock D¹⁶.

In the use of the apparatus the drip composed of water and oil, with more or less air, and sometimes other elements, as a waxy substance or metallic particles, flows upward through the pipe A' with variable degrees of force, each exhaust action of the engine tending to generate a sensible pulsation in the movement of the drip. If the motion is sufficiently violent at any time, drops of the drip or even considerable splashes are liable to be thrown upward from the end of the pipe A'. In such case the jets are arrested by the perforated plate A² and it is allowed to drop quietly back into the mass of liquid previously in the tank. Ordinarily the motion will be less violent and there will be only a gentle overflow from the upper end of the pipe A'. When the apparatus is in operation, the surface of the liquid in the tank A will stand a very little—say an eighth of an inch—above the level of the upper end of the pipe D'. The level in the tank A will under these conditions be immediately adjacent to the upper end of the pipe A' and the water will be delivered through the pipe A' and allowed to mingle with the mass in the tank A with extremely gentle motion. The horizontal plates A⁶ extinguish any agitation which exists from any cause, and there is a gentle downward motion of the entire contents of the tank A. Under these conditions the particles of oil or emulsion are certain to rise, although their levity may be only a little in excess of that of the water with which they are associated. They constitute a more or less perfectly divided layer on the top of the water, the lightest particles being at the extreme top and the half-separated particles below. At intervals the cock A⁸ is turned and a quantity of the surface material drawn off from the first tank. It will be mainly oil, and if allowed to stand in a proper tank for a time will be still further separated and may be utilized with or without other treatment for lubricating or for soap-making or various other uses.

The mainly-important product is the nearly pure water received from the bottom of the tank A through the pipe B. There are liable to be some traces of oil and of waxy or other semisolid materials in the water thus discharged. The second tank with its internal pipe D' makes a similar provision for the further separation by the levity of the particles containing oil or air, and the overflow-cock D¹⁶ may be turned and a small quantity discharged. This discharge from the second tank will only be required at long intervals. The oil-scum from the first tank may be removed much oftener, or constantly when desired.

The water in its slow descent in the second tank finds a great extent of surface in the woody particles filling the mid-depth. A considerable quantity of thick material, mainly of paraffin-wax or animal oil or both, will collect on the ample surfaces presented by the sawdust, requiring that it be removed and new substituted from time to time.

E E are stop-cocks inserted near the lowest points in the respective hollowed bottoms of the tanks, by opening which the tanks can be emptied when required. I can introduce corresponding cocks to empty the lowest part of the drip-pipe K, which brings the liquid to the pipe A', and the connecting-pipe B, which carries the liquid from the first tank A to the pipe D'.

The oil and the wax or paraffin may both be recovered by suitable treatment after their removal.

Modifications may be made without departing from the principle or sacrificing the advantages of the invention. Where it is important to economize room, the parts may be applied more compactly together. There may be a third vessel with corresponding provisions for avoiding agitation and a conditioning of the liquid, so that the very slight difference in the gravity of the particles will cause them to separate.

Parts of the apparatus described can be used without the whole.

The glass gage D¹⁴ may, if preferred, extend quite up to the top of the tank D.

I claim as my invention—

1. In a separator for drip, a vessel, a pipe for discharging drip within the same, a water-discharge passage delivering from a low point in the vessel and a valve-controlled oil-discharge passage leading from the upper portion thereof, all combined and operating substantially as herein specified.

2. In a separator for drip, a vessel, a pipe for discharging drip within the same, an overflow-pipe communicating with the lower part of the vessel, and a valve-controlled oil-discharge passage leading from the upper portion thereof, all combined and operating substantially as herein specified.

3. In a separator for drip, a vessel A, a pipe for discharging drip within the same, a retarder in the vessel, a water-discharge passage communicating with the lower part of the latter, and a valve-controlled oil-discharge passage leading from the upper portion thereof, all combined and operating substantially as herein specified.

4. In a separator for drip, a vessel A, a pipe A' within the same for discharging the drip in the upper portion of the vessel, a discharge-passage B, from a low point in the vessel, and a valve-controlled discharge A⁷ in a plane above the discharge of the pipe A', all arranged for joint operation substantially as herein specified.

5. In a separator for drip, a vessel A, a pipe A' within the same for discharging the drip in the upper portion of the vessel, a discharge-passage B, from a low point in the vessel, a valve-controlled discharge $A^7$ in a plane above the discharge of the pipe $A'$, and a retarder $A^6$, adapted to insure a slow and uniform descending motion of the water, all substantially as herein specified.

6. In a separator for drip, a vessel A, an upright pipe $A'$, within the same for discharging the drip in the upper portion of the vessel, a discharge-passage B from a low point in the vessel and a valve-controlled discharge $A^7$ in a plane above the upper end of the pipe $A'$, in combination with a second vessel or tank D, with two corresponding discharges vertically upward into which the pipe B extends and terminates in a plane below the end of the pipe $A'$ in the tank A, all arranged for joint operation substantially as herein specified.

7. In a separator for drip, a vessel A, an upright pipe $A'$, within the same for discharging the drip in the upper portion of the vessel, a discharge-passage B, from a low point in the vessel and a valve-controlled discharge $A^7$ in a plane above the upper end of the pipe $A'$, in combination with a second tank D with two corresponding discharges, and into which the pipe B vertically extends and terminates in the upper part thereof, and a filter of finely-divided material M in one of the tanks, all arranged for joint operation substantially as herein specified.

8. In a separator for drip, a vessel A, an upright pipe $A'$ within the same for discharging the drip in the upper portion of the vessel, a discharge-passage B, from a low point in the vessel and a valve-controlled discharge $A^7$ in a plane above the upper end of the pipe $A'$, in combination with a second tank D, with two corresponding discharges, and into which the pipe B vertically extends and terminates in the upper part thereof, and perforated plates removably supported in one of the tanks and combining finely-divided filtering material M with provisions permitting the removal of the latter without disturbance of the plates, all arranged for joint operation substantially as herein specified.

In testimony that I claim the invention above set forth I affix my signature in presence of two witnesses.

SIDNEY BANCROFT.

Witnesses:
J. B. CLAUTIER,
M. F. BOYLE.